United States Patent
Collins et al.

(10) Patent No.: US 8,321,275 B2
(45) Date of Patent: *Nov. 27, 2012

(54) ADVERTISER REPORTING SYSTEM AND METHOD IN A NETWORKED DATABASE SEARCH SYSTEM

(75) Inventors: Robert J. Collins, Carlsbad, CA (US); Paul Joseph Apodaca, Carlsbad, CA (US); Adam J. Wand, Carlsbad, CA (US); Claude Jones, III, San Marcos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1022 days.

This patent is subject to a terminal disclaimer.

(21) Appl. No.: 11/413,699

(22) Filed: Apr. 28, 2006

(65) Prior Publication Data

US 2007/0033104 A1  Feb. 8, 2007

Related U.S. Application Data

(60) Provisional application No. 60/703,904, filed on Jul. 29, 2005.

(51) Int. Cl.
*G06Q 30/00* (2012.01)
(52) U.S. Cl. .................. 705/14.43; 705/14.42
(58) Field of Classification Search .............. 705/14, 705/14.43, 14.42
See application file for complete search history.

(56) References Cited

U.S. PATENT DOCUMENTS

| | | | |
|---|---|---|---|
| 5,848,396 A * | 12/1998 | Gerace | 705/10 |
| 6,269,361 B1 * | 7/2001 | Davis et al. | 707/3 |
| 6,763,104 B1 * | 7/2004 | Judkins et al. | 379/265.09 |
| 6,826,572 B2 | 11/2004 | Colace et al. | 707/10 |
| 7,043,483 B2 | 5/2006 | Colace et al. | 707/10 |
| 7,065,500 B2 | 6/2006 | Singh et al. | 705/26 |
| 7,188,169 B2 * | 3/2007 | Buus et al. | 709/224 |
| 2002/0082914 A1 | 6/2002 | Beyda et al. | |
| 2002/0103698 A1 | 8/2002 | Cantrell | |
| 2004/0068435 A1 | 4/2004 | Braunzel | |
| 2005/0021403 A1 | 1/2005 | Ozer et al. | |
| 2005/0027594 A1 | 2/2005 | Yasnovsky et al. | |
| 2005/0267803 A1 * | 12/2005 | Patel et al. | 705/14 |
| 2006/0230029 A1 * | 10/2006 | Yan | 707/3 |

OTHER PUBLICATIONS

"The Importance of Being Found" by: John Harrison; LIMRA's MarketFacts Quarterly; v24n1; pp. 76-86; Winter 2005.*
Office Action issued in U.S. Appl. No. 11/413,535, Jun. 24, 2008, 19 pages.
Office Action issued in U.S. Appl. No. 11/413,535, Dec. 22, 2008, 20 pages.

* cited by examiner

*Primary Examiner* — John Weiss
*Assistant Examiner* — Michael Stibley
(74) *Attorney, Agent, or Firm* — Brinks Hofer Gilson & Lione

(57) ABSTRACT

A system and method provide advertisement campaign information about an advertisement campaign to an advertiser. The system includes means for organizing advertisement campaign information into one or more ad groups and a web interface to receive advertiser inputs and provide a visual report including the advertisement campaign information to the advertiser. The system further includes a campaign data store configured to store advertisement campaign account data and a reporting system to produce the visual report about performance of the advertisement campaign. The visual report is based on the organization of the advertisement campaign information into the one or more ad groups.

8 Claims, 6 Drawing Sheets

FIG. 3

| YAHOO! | SEARCH MARKETING | WELCOME, CLAUDE.JONES [SIGN OUT, PREFERENCES] | | ✉ SUPPORT CENTER | ? HELP | ? PRD |
|---|---|---|---|---|---|---|
| DASHBOARD | CAMPAIGNS | REPORTS | ACCOUNT ADMINISTRATION | MASTER ACCOUNT | XYZ ELECTRONUCS ▾ | |

MARKETING ACTIVITY COST

MARKETING ACTIVITY COST

| ACTIVITY COST ENTRIES | ⊞ ADD A COST ENTRY | | | SHOW 10/01/05 TO 10/14/05 ☐ |
|---|---|---|---|---|

| OBJECT LEVEL | OPERATOR | VALUE | CHANNEL | TACTIC | |
|---|---|---|---|---|---|
| -SELECT- ▾ | -SELECT- ▾ | | -ALL- ▾ | -ALL- ▾ | SEARCH |

▼ DELETE

| ☐ | CAMPAIGN | AD GROUP | ACTIVITY | CHANNEL | TACTIC |
|---|---|---|---|---|---|
| ☐ | CAMPAIGN 1 | | | CHANNEL | TACTIC |
| ☐ | CAMPAIGN 2 | | | CHANNEL | TACTIC |
| | CAMPAIGN 3 | | | CHANNEL | TACTIC |

▲ DELETE

DISPLAY [25 ▾] LINES PER PAGE    RESULTS 1-20 OF 245 << FIRST <PREVIOUS | 1 2 3 4 | NEXT > LAST >>

ADVERTISER REPORTING SYSTEM AND METHOD IN A NETWORKED DATABASE SEARCH SYSTEM

RELATED APPLICATIONS

The present patent document claims the benefit of the filing date under 35 U.S.C. §119(e) of Provisional U.S. Patent Application Ser. No. 60/703,904, filed Jul. 29, 2005, the entirety of which is hereby incorporated herein by reference.

BACKGROUND

The present application relates generally to online advertising systems. More particularly, the present application relates to an advertiser reporting system and method in a networked database search system.

Users who advertise with an online advertisement service provider such as Yahoo! Search Marketing typically manage various types of online advertising through the use of a user interface to an advertisement management system of the advertisement service provider. Traditionally, users have been able to perform operations with the user interface such as adding, editing, or removing advertisements from their account, or modifying various parameters associated with advertisements such as budget parameters or performance parameters.

Current to online advertisement service providers only allow users to get limited reports on the status of their advertisements and accounts. A typical report includes a list of search terms, current bid amounts, and some historical data such as number of clicks received in a given time. As online advertising has increased in popularity, users may have thousands of advertisements that need to be managed at any given time. Therefore, it is desirable to provide to a user an advertisement campaign system that allows users to flexibly, dynamically, and efficiently manage large groups of advertisements as defined by the advertiser rather than the advertisement service provider. One part of the solution is a system and method for reporting on advertisements and the advertiser's accounts.

BRIEF DESCRIPTION OF THE DRAWINGS

FIG. 3 is an example of one embodiment of a graphical user interface displaying advertisement campaign information;

FIG. 4 is an example of user interface for a marketing activity cost report page;

FIG. 5 is an example of user interface for a Marketing Activity Cost entry page.

DETAILED DESCRIPTION OF THE PRESENTLY PREFERRED EMBODIMENTS

Figure 5:
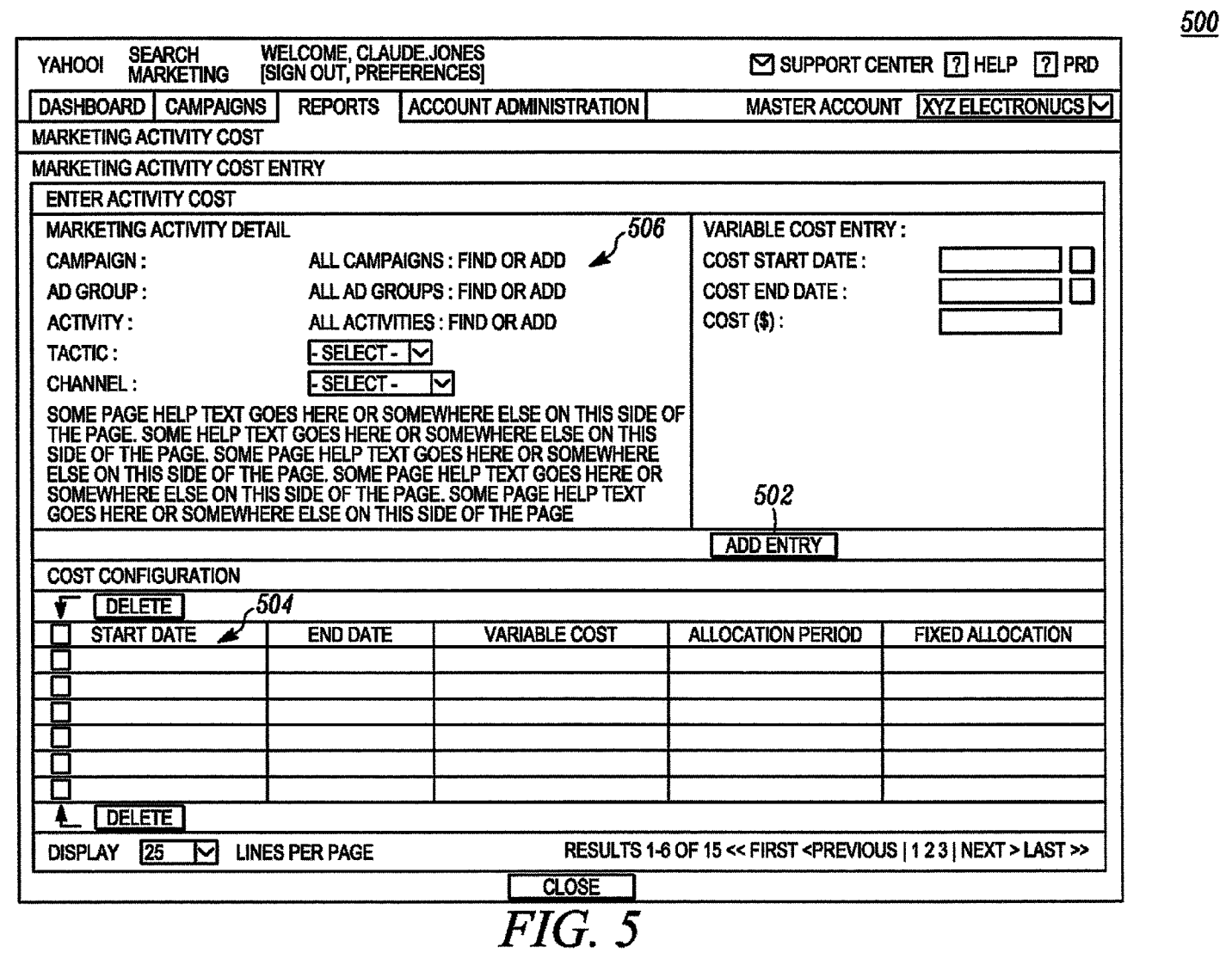
Figure 6:
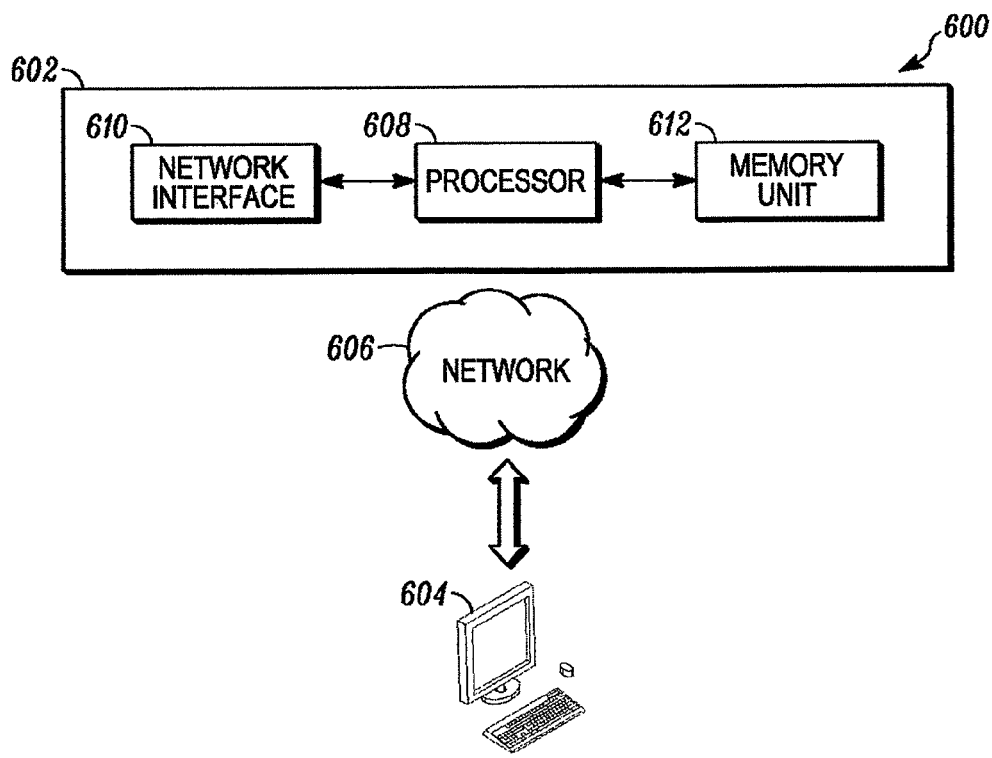
FIG. 6 is a block diagram of one embodiment of a system for providing advertisement campaign information about an advertisement campaign to an advertiser.
Figure 7:
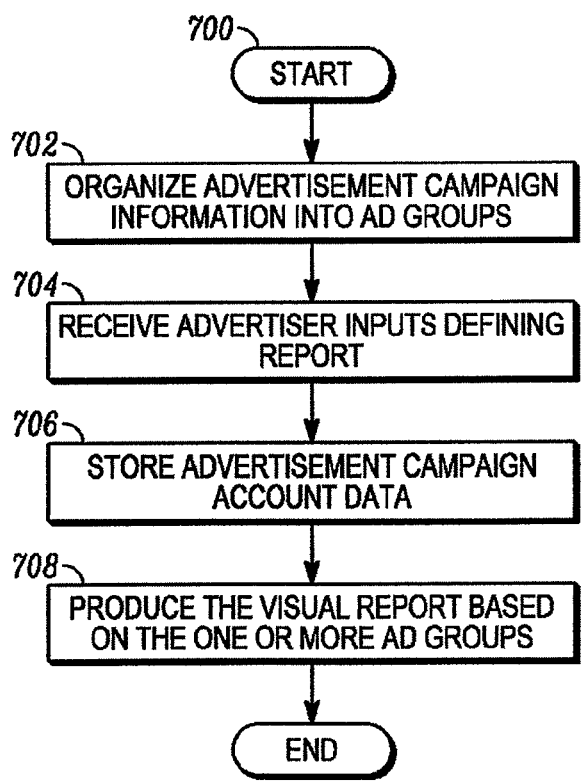
FIG. 7 is a flow diagram of one embodiment of a method for providing advertisement campaign information about an advertisement campaign to an advertiser.

The advertisement campaign management system as described with reference to FIGS. 1 and 2, the graphical user interfaces as described with reference to FIGS. 3-5, and the systems and methods as described with reference to FIGS. 6-7 provide access to an advertisement campaign management system that provides users and machines the ability to flexibly, dynamically, and efficiently manage large groups of advertisements. As opposed to interfaces to advertisement campaign management systems that only provide the ability to manage advertisement campaign information at a user account level or an individual advertisement level, the disclosed advertisement campaign management system provides the ability to manage advertisement campaign information at a level defined by the user. Users are given the ability to define their own groups of advertisement campaign information (an ad group) for advertisements that will be handled by the advertisement campaign management system in a similar manner. For example, users may group advertisements by a search tactic, performance parameter, demographic of a user, family of products, or almost any other parameter desired by the user. Allowing users to define their own ad groups allows the advertisement campaign management system to provide more useful information to the user thereby allowing the user to display, manage, optimize, or view reports on, advertisement campaign information in a manner most relevant to an individual advertiser.

Figure 1:
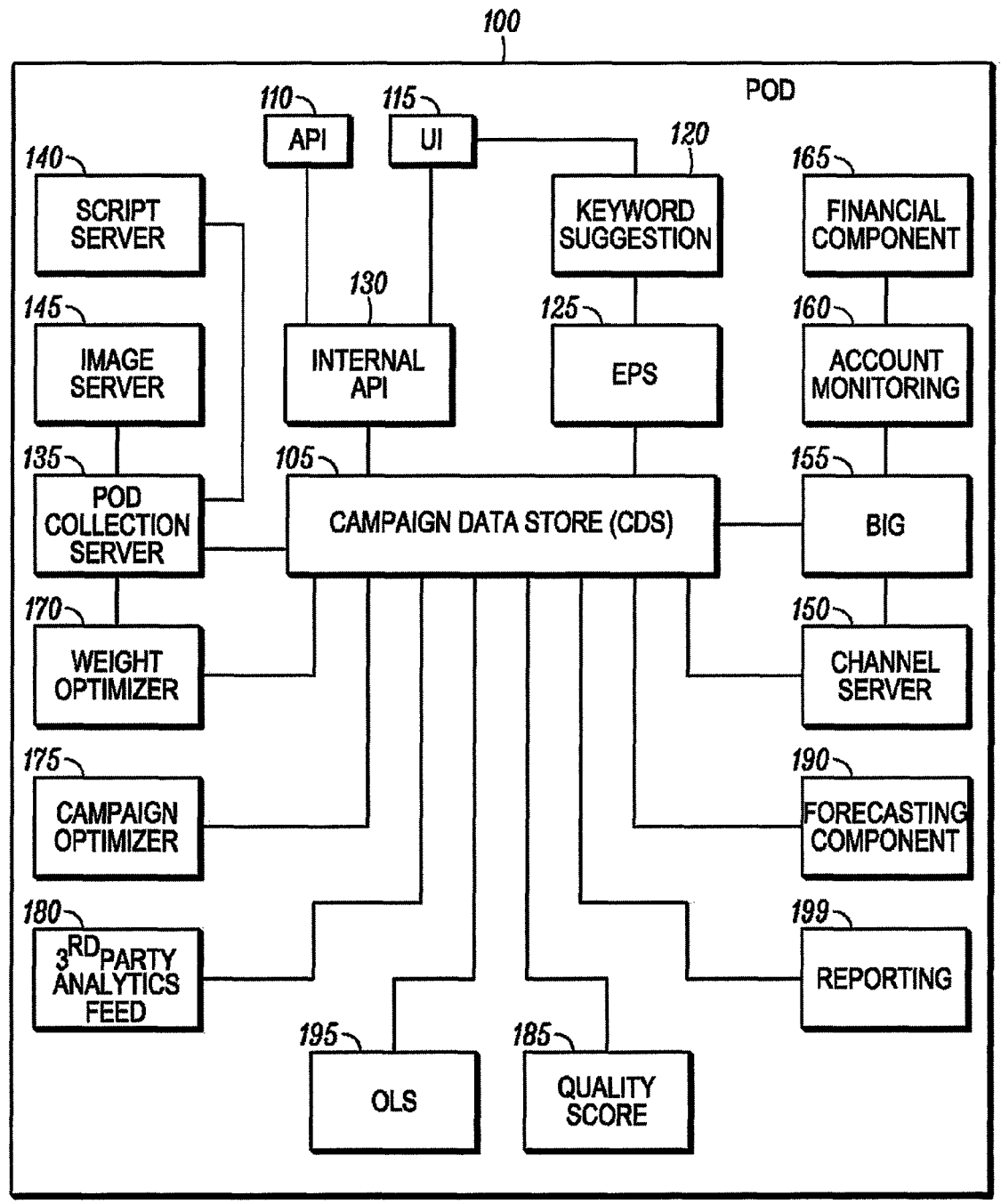
FIG. 1 illustrates one embodiment of a pod of an advertisement campaign management system.

FIG. 1 illustrates one embodiment of a pod of an advertisement ("ad") campaign management system. For additional information on the advertisement campaign management system, reference is made to U.S. patent application Ser. No. 11/324,129, filed Dec. 30, 2005 and entitled SYSTEM AND METHOD FOR ADVERTISEMENT MANAGEMENT, which application is incorporated herein in its entirety by this reference. Pod 100 comprises a plurality of software components and data for facilitating the planning, management, optimization, delivery, communication, and implementation of advertisements and ad campaigns, as well as for storing and managing user accounts. In one embodiment, a pod 100 comprises a campaign data store ("CDS") 105 that stores user account information. Application Program Interfaces ("APIs") 110 and User Interfaces ("UI") 115 are used for reading data from and writing data to the campaign data store 105. Internal APIs 130 provide shared code and functions between the API and UI, as well as facilitate interface with the campaign data store 105. A keyword suggestion component 120 may assist users in searching for available search terms. An editorial processing system ("EPS") 125 may be provided to review content of all new ads. A pod collection server ("PCS") 135 determines which pod the collected ad campaign performance data should go to. A script server 140 provides scripts for collection of data indicative of the customer browsing sessions. An image server 145 receives and processes data indicative of the customer browsing sessions from the customer web browsers.

The pod may further comprise a channel server 150 operative to receive data from one or more advertising channels. A business information group ("BIG") 155 may provide analysis and filtering of raw click data coming from the advertising channels through the channel server 150. An account monitoring component 160 monitors budgets allocated for each ad campaign. A financial component 165 may be provided for planning and budgeting ad campaign expenses. A weight optimizer 170 operative to optimize individual ad performance. A campaign optimizer 175 may be provided to optimize performance of the ad campaign. A third-party analytical feed component 180 is provided to handle the incoming ad performance data from the third-party sources. A quality score component 185 provides yet another metric for measuring individual ad performance. A forecast component 190 is an analytical tool for predicting keywords trends. Finally, an online sign-up ("OLS") component 195 provides heightened security services for online transactions involving exchange of moneys.

The CDS 105 is the main data store of pod 100. In one embodiment, CDS 105 stores ad campaign account data, including account access and permission lists, user information, advertisements, data collected from advertiser websites indicative of customer browsing sessions, raw click data received from the advertising channels, third party analytical feeds, ad campaign performance data generated by the system, ad campaign optimization data, including budgets and business rules, etc. In various embodiments of the invention, CDS 105 stores one or more account data structures as illustrated in FIG. 2 and described in greater detail below.

Data in the CDS 105 may be stored and accessed according to various formats, such as a relational format or flat-file format. CDS 105 can be managed using various known database management techniques, such as, for example, SQL-based and Object-based. At the physical level, the CDS 105 is implemented using combinations of one or more of magnetic, optical or tape drives. Furthermore, in one embodiment of the invention, CDS 105 has one or more back up databases that can be used to serve Pod 100 during downtime of CDS 105.

In one embodiment, a pod 100 exposes one or more APIs 110 and UIs 115 which are utilized by the system users, such as advertisers and agencies, to access services of the ad campaign management system, such as for reading data from and writing data to the campaign data store 105. The advertisers and their agencies may use the APIs 110, which in one embodiment includes XML-based APIs, to allow access to the ad campaign management system and data contained therein. In one embodiment, the UI 115 comprises a website or web application(s) for enabling user access to the ad campaign management system. The pod 100 utilizes internal APIs 130, which are shared code and functions between the APIs 110 and UI 115, to facilitate interaction with campaign data store 105.

According to some embodiments, the above-described user and application program interfaces are used to facilitate management and optimization of ad campaigns, which include, but are not limited to, management of listings associated with an auction-based search-term related sponsored search results listings marketplace. For example, advertisers use these interfaces to access ad campaign information and ad campaign performance information saved in the ad campaign data store 105, search the information, analyze the information, obtain reports, summaries, etc. Advertisers may also change listings or bidding strategies using these interfaces, which changes are updated in the campaign data store 105. Furthermore, these interfaces may be used to perform comparisons of the performance of components of ad campaigns, such as performance of particular listings, search terms, creatives, channels, tactics, etc.

While functionality and use of application program interfaces of the pod is described with reference to an auction-based search term-related sponsored listings context, it is to be understood that, in some embodiments, these interfaces may be used with regard to off-line or non-sponsored search ad campaigns and ad campaign performance, or combinations of on-line and off-line ad campaigns information, as well.

A keyword suggestion component 120 provides for keyword suggestion through interfaces 110, 115 for assisting users with ad campaign management based on seed terms or a universal resource locator ("URL") provided by a user. In one embodiment of the invention, the keyword suggestion component 120 assists users to search for available search terms. As described above, in an auction-based system or marketplace, advertisers bid for search terms or groups of terms, which, when used in a search by customers, will cause display advertisement listings or links among the search results. The keyword suggestion component 120 provides suggestions to advertisers regarding terms they should be bidding. In one embodiment, the keyword suggestion component 120 may look at actual searches conducted in the last month and provide a suggestion based upon previous searches. In another embodiment, the keyword suggestion component 120 may look at the terms other advertisers of similar products or services are bidding on and suggest these terms to the advertiser. In yet another embodiment, the keyword suggestion component 120 may determine terms that customers who bought similar products or services use in their searches and suggest these terms to the advertiser. In another embodiment, the keyword suggestion component 120 may maintain a table of terms divided into several categories of products and services and allow an advertiser to browse through and to pick the available terms. In other embodiments, the keyword suggestion component 120 may use other techniques for assisting advertisers in the term selection process, such as suggesting a new term to the advertiser if the advertised products and services are unique.

The editorial processing system (EPS) 125 ensures relevance and mitigates risks of advertisers' listings before a listing can participate in the auction. In general, the EPS 125 reviews new or revised ads. In one embodiment, the EPS 125 applies a set of business rules that determines accuracy and relevance of the advertiser listings. These rules may be applied automatically by the EPS 125 or through a human editorial review. The EPS 125 may, for example, detect inappropriate content in the advertiser listings or illegally used trademark terms. In one, EPS 125 responds with an annotation such as rejected, approved, rejected but suggested changes, etc.

In one embodiment, EPS 125 may comprise a quick check component. The quick check component performs a preliminary or a "quick check" to determine whether to accept or reject an ad automatically before it is submitted to a human editor and stored in the campaign data store 105. In one embodiment, either API 110 or a UI 115 invokes the quick check component service so that advertiser can receive instant feedback. For example, use of prohibited words, such as "best" in the submitted advertisement, may be quickly detected by the quick check component and, obviating the need for human editorial review. In contrast, using words such as gambling, adult services, etc., the quick check component might determine that the ad requires a more thorough editorial review. One of the benefits of the quick check component is the rapid provision of feedback to the advertiser, which enables the advertiser to revise the listing right away and thus to expedite review by the human editor.

Again with reference to FIG. 1, according to one embodiment, the pod 100 may further comprise a channel server 150, which is operable to receive and process data received from an advertising channel, such as Google.com and MSN.com. This data may include but is not limited to the customer profiles, historical user behavior information, raw impressions, cost, clicks, etc. Additional description of user information and its uses can be found in U.S. Patent Application No. 60/546,699 and Ser. No. 10/783,383, the entirety of which are both hereby incorporated by reference. The channel server 150 may further be operable to re-format the received data into a format supported by the ad campaign management system and to store the reformatted data into the campaign data store 105.

In one embodiment, pod 100 may further comprise a business information group (BIG) component 155. BIG 155 is operable to receive cost, click, and impression data that is coming into the pod 100 from various sources including the channel server 150, pod collection server 135 and third-party analytics feeds component 180. BIG 155 assures that this data is received in a correct and timely manner. In one embodiment, BIG 155 may also perform aggregation and filtering on raw data impressions and clicks that are coming into the pod 100. BIG 155 may be further operable to store the collected and processed data into the Campaign Data Store 105. In other embodiments, BIG 155 may also perform internal reporting, such as preparing business reports and financial projections according to teaching known to those of skill in the art. To that end, in one embodiment, BIG 155 is operable to communicate with the Account Monitoring component 160, which will be described in more detail next.

In one embodiment, the pod 100 may further comprise an account monitoring component 160. This component 160 may be operable to perform budgeting and campaign asset allocation. For example, the account monitoring component 160 may determine how much money is left in a given advertiser's account and how much can be spent on a particular ad campaign. In one embodiment, the account monitoring component 160 may employ a budgeting functionality to provide efficient campaign asset allocation. For example, an advertiser may set an ad campaign budget for a month to $500. The account monitoring component 160 may implement an ad bidding scheme that gets actual spending for that month as close to $500 as possible. One example of a bidding scheme employed by the account monitoring component 160 would be to lower the advertiser's bids to reduce how often the advertiser's ads are displayed, thereby decreasing how much the advertiser spends per month, which may be performed dynamically. Another example of budgeting by the account monitoring component 160 is to throttle the rate at which advertisements are being served (e.g., a fraction of the time it is served) without changing the advertiser's bid (whereas in the previous example the bid was changed, not the rate at which advertisements were served). Another example of throttling is to not serve an ad as often as possible but put it out according to a rotation.

In one embodiment, the pod 100 may further comprise a financial component 165, which may be an accounting application for planning and budgeting ad campaign expenses. Using the financial component 165 advertisers may specify budgets and allocate campaign assets. The financial component 165 provides an advertiser with the ability to change distribution of campaign budget and to move money between different campaigns. The financial component 165 may also present advertisers with information on how much money is left in the account and how much can be spent on a particular ad campaign. In some embodiments, the financial component 165 may further be operable to provide advertisers with information regarding profitability, revenue, and expenses of their ad campaigns. The financial component 165 may, for example, be implemented using one or more financial suites from Oracle Corporation, SAP AG, Peoplesoft Inc., or any other financial software developer.

In one embodiment, pod 100 may further comprise an online sign-up (OLS) component 195. The OLS component 195 may be operable to provide advertisers with a secure online sign-up environment, in which secure information, such as credit card information, can be exchanged. The secure connection between the advertiser computer and the OLS component 195 may be established, for example, using Secure Hypertext Transfer Protocol ("SHTTP"), Secure Sockets Layer ("SSL") or any other public-key cryptographic techniques.

In one embodiment, the pod 100 may further comprise a quality score component 185 that calculates one or more values such as an ad clickability score and a quality score. An ad clickability score is one of the ad performance parameters whose value represents a quality of an ad at the time the advertisement service provider serves the ad. The ad clickability score is internal to the ad campaign management system and is typically not exposed external to the ad campaign management system. A quality score is one of the ad performance parameters that is exposed externally from that ad campaign management system and may be used by the search serving components, such as advertising channels and search engines, to qualify the relative quality of the displayed ads. Thus the quality score is calculated by the search serving components and fed into the ad campaign management system through the quality score component 185 in accordance with one embodiment of the present invention. In some embodiments, the quality score is displayed to the advertiser, so that the advertiser may revise the ad to improve its quality score. For example, if an ad has a high quality score, then the advertiser knows not to try to spend money and time trying to perfect the ad. However, if an ad has a low quality score, it may be revised to improve ad's quality score.

In one embodiment, the pod 100 further comprises a forecasting component 190, which is an analytical tool for assisting the advertiser with keyword selection. In some embodiments, the forecasting component is operable to predict keywords trends, forecast volume of visitor traffic based on the ad's position, as well as estimating bid value for certain ad positions.

In one embodiment, the forecasting component 190 is operable to analyze past performance and to discover search term trends in the historical data. For example, the term "iPod" did not even exist several years ago, while now it is a very common term. In another embodiment, the forecasting component 190 performs macro-trending, which may include forecasting to determine terms that are popular in a particular region, for example, California, or with particular demographic, such as males. In yet another embodiment, the forecasting component 190 provides event-related macro- and micro-trending. Such events may include, for example, Mother's Day, Christmas, etc. To perform event-related trending for terms related to, for example, Mother's Day or Christmas, the forecasting component 190 looks at search patterns on flower-related terms or wrapping paper terms. In other embodiments, the forecasting component 190 analyzes the historic data to predict the number of impressions or clicks that may be expected for an ad having a particular rank. In another embodiment, the forecasting component 190 is operable to predict a bid value necessary to place the ad in a particular position.

In one embodiment, the pod 100 further comprises a weight optimizer 170, which may adjust the weights (relative display frequency) for rotating elements as part of alternative ad ("A/B") functionality that may be provided by the ad campaign management system in some embodiments of the present invention. The A/B testing feature allows an advertiser to specify multiple variants of an attribute of an ad. These elements may include creative (title, description and display URL), destination (landing URL) and perhaps other elements such as promotions and display prices. More specifically, when an end-user performs a search, the ad campaign management system assembles one of the possible variants of the relevant ad and provides it to the advertising channel for display to the end-user. The ad campaign management system may also attach tracking codes associated with the ad, indicating which variant of each attribute of the ad was actually served. The behavior of the end-user then may be observed and the tracking codes may be used to provide feedback on the performance of each variant of each attribute of the ad.

In determining the weight for a particular element, the weight optimizer component 170 may look at actual performance of ads to determine optimal ads for delivery. The weight optimizer component 170 operates in multiple modes. For example, in Optimize mode the weight (frequency of display) of each variant is changed over time, based on the measured outcomes associated with each variant. Thus, the weight optimizer component 170 is responsible for changing the weights based on the measured outcomes. The weight optimizer component may also operate according to Static mode, in which the weights (frequency of display) of each variant are not changed by the system. This mode may provide data pertaining to measured outcomes to the advertiser. The advertiser may have the option to manually change the weights.

The pod 100 may further comprise a campaign optimizer component 175, which facilitates ad campaign optimization to meet specific ad campaign strategies, such as increasing number of conversions from displayed ads while minimizing the cost of the campaign. To that end, in some embodiments, campaign optimizer component 175 uses data received from the channel server 150, forecasting component 190, third party analytics feed component 190, quality score component 185, and BIG 155 to determine how much to bid on which ads, how to allocate the budget across different ads, how to spend money over the entire period of the campaign, etc. Furthermore, campaign optimization not only focuses on executing ads efficiently, but also performing arbitrage between ads across various channels and tactics to determine where the limited ad campaign budget is most effective.

In one embodiment, the campaign optimizer component 175 analyzes the obtained analytics data, including ad campaign information, ad campaign performance information, as well as potentially other information, such as user information, to facilitate determining, or to determine, an optimal ad campaign strategy. Herein, an "optimal" ad campaign strategy includes any ad campaign strategy that is determined to be optimal or superior to other strategies, determined to be likely to be optimal, forecasted or anticipated to be optimal or likely to be optimal, etc. In some embodiments, optimizing is performed with respect to parameters, or a combination of parameters, specified by an advertiser, supplied automatically or partially automatically by the ad campaigns facilitation program, or in other ways.

In addition to the foregoing, ad campaign strategy may include any course of action (including, for example, changing or not changing current settings or strategy) or conduct, or aspects or components thereof, relating to an ad campaign. An ad campaign strategy may include a recommendation regarding a course of action regarding one or more aspects or parameters of an ad campaign, and may include an immediate course of action or set of parameters, or a course of action or set of parameters for a specified window of time. For example, an optimal ad campaign strategy in the context of an auction-based search result listings situation, may include recommendations relating to bidding and bid hiding rates in connection with an auction or marketplace relating to search term or group of terms in connection with sponsored listings.

In some embodiments, the campaign optimizer component 175 may be operable to analyze ad campaign performance information to determine an optimal ad campaign strategy. Ad campaign performance information may include a variety of information pertaining to historical performance of an ad campaign, channel, tactic, or ad or group of ads. Ad campaign performance information can include many types of information indicating or providing a suggestion of how effectively ads, or ads presented though a particular channel, etc., influence or are likely to influence user or consumer behavior. For example, an advertising channel such as Yahoo! may collect performance information with respect to a particular sponsored search result listing. The information may include a number or percentage of viewers who clicked on the link, or who shopped at or purchased a product at the advertisers Web site as a result of the listing, etc.

The campaign optimizer component 175 may be operable to analyze ad campaign information to determine an optimal ad campaign strategy. Ad campaign information may include campaign objectives or budget-related conditions or constraints, or can include information specifying, defining, or describing ads themselves, channels, tactics, etc. With regard to auction-based sponsored search result listings, ad campaign information can include bidding parameters such as maximum or minimum bids or bidding positions (rankings or prominence of listings) associated with a term or term cluster, for instance, as further described below. Such ad campaign information can also include campaign objectives, quotas or goals expressed, for example in metrics such as ROAS (return on ad spend), CPI (clicks per impression), or in other metrics, and with respect to individual ads, terms or term groups, channels, tactics, etc.

The campaign optimizer component 175 may further include bid optimization functionality, which may be used by the system to determine a desirable or optimal bid for a listing, such as a paid search result. The bid optimization functionality of the campaign optimizer component 175 may be used to constrain the set targets and constraints on the bids set by an advertiser. The constraints may include a maximum bid and a minimum bid. The targets may be associated with the listing and can be specified in terms of one or more metrics related to the performance of the listing. The campaign optimizer component 175 may analyze recent past analytics in connection with the metric and specify a bid recommendation forecasted by the bid optimizer functionality to achieve the target or get as close to the target as possible. In some embodiments, the campaign optimizer component 175 can also provide a recommendation for a listing, which may include a maximum bid and an update period, which update period can be a time between maximum bid hiding updates. In other embodiments, the campaign optimizer component 175 can also provide a recommendation including a range of values that should allow the listing to obtain a premium position when served, such as a first page listing.

To facilitate ad campaign management and optimization, the pod 100 is further operable to collect visitor state data from the advertiser websites in accordance with a preferred embodiment of the ad campaign management system. To that end, the pod 100 utilized pod collection server 135, script server 140, and image server 145 to collect visitor state data and to store the same in the campaign data store 105. The collected visitor state data may then be used by various components of the pod 100 including, but not limited to, campaign optimizer component 175, forecasting component 190, and BIG 155 to generate ad campaign performance data in accordance with various embodiments of the present disclosure.

The various methods of data collection in accordance with various embodiments of the present invention may include, but are not limited to, full analytic, campaign only, conversion counter and sampling. In one embodiment, full analytics collection provides the most robust collection method. The full analytics collection collects marketing-based and free search-based leads. As a result, the advertiser may see a complete picture of how leads and conversions are generated. Primarily, the full analytics collection method provides a full funnel report that will provide a key view into how visitors of the advertiser website go from being a lead through to browser, prospect, and finally a paying customer. Visitor state storage on Campaign Data Store 105 may also allow for repeat and return customer report data and for a full suite of accreditation methods.

In another embodiment, a campaign only analytics collection method is much like full analytic but only paid marketing events are tracked and result events generated from free search are ignored or discarded. This has the advantage of providing funnel and repeating visitor reports as well as a reduced data collection and storage rate. The campaign only analytics method provides a balance of rich report data and reduced collection, processing, and storage cost.

In yet another embodiment, the conversion counter method is the most simple analytics data collection available. With conversion counter analytics, the advertiser places a tag on pages where value is generated for the advertiser, such as revenue. The image server 145 places the lead "stack" in a cookie, which may be used to accredit the proper term/creative to the conversion event. This data collection mechanism generates enough data to provide optimization on creative weighting. It should be further noted that in one embodiment a direct accreditation method may be applied to the conversion counter method. In the conversion counter approach, no visitor state storage is needed and only conversion events are received. Thus, this approach has a minimal effect on pod 100 load and data storage requirements. In another embodiment, a sampling method is utilized. In accordance with this method, only a random number of unique visitors, for example, 10%, are tracked, which reduces data collection and storage.

In order to allow for accreditation of the lead generation source to a conversion event, the state of the customer session on the advertiser's website may be maintained. Accreditation is the process by which all the marketing events are tied to a specific, or set of specific, marketing activities. There are two known approaches that may be utilized for storage of visitor state: client-side cookies and server-side database.

In one embodiment, cookies may be used as an exemplary client-side visitor state storage. When cookies are used to store visitor state one of two methods may be used to store visitor state. A redirection server used on the lead generating event may add the visitor state to the cookie at the click event. Alternatively a collection server may set the cookie at the time of a lead event. While visitor state in the cookie approach is the most cost effective it has several disadvantages. Generally, cookies have low storage requirements and thus an active search user (typically, most valuable users because they generate the most revenue) could lose accreditation information as their lead stack grows and causes some older events to be pushed out. As a result, a conversion event could occur where the lead information was lost in the stack and thus the accreditation is lost. Furthermore, cookie-off users are essentially invisible to the system. Moreover, efficacy is reduced due to the additional time needed to parse the collection server request when the cookie is set, which may cause end users to click away from the lead page before the cookie can be completed. Finally, cookie based visitor state storage prevents any internal analysis of user behavior.

In another embodiment, server-side database, such as the CDS 105, may be used to store visitor state. Using server side storage in a database offers the high efficacy rates but at the additional cost of the storage. Using server side storage of visitor state allows the ad campaign management system to have more advanced accreditation models, which could allow for assist-based accreditation. Efficacy rates over cookie based visitor state storage are increased due to many factors. Primarily the system is no longer limited in the amount of visitor state storage a single user can have so no lead loss would occur. Cookies off users can still be traced as unique visitors so they can still be tracked (although at a reduced rate of accuracy) and thus are able to be included. Collection event processing latency is greatly reduced because the event can be just logged and then actually processed later. With the cookie approach lead accreditation has to occur at the time the event is received because the cookie must be evaluated before the request is returned by the beacon servers. Furthermore, with visitor state stored in the campaign data store, valuable marketing data can be collected and analyzed for internal use.

In one embodiment, the ad campaign management system utilizes a combination of the above-described client-side cookies and server-side database techniques to collect and maintain visitor state data. In particular, as indicated above the pod 100 utilizes pod collection server 135, script server 140, and image server 145 to collect visitor state data and to store the same in the campaign data store 105. In one embodiment, the pod collection server 135, script server 140 and image server 145 may be implemented, for example, as Java servlets.

Reporting system 199 provides applications, utilities and data for providing customized reports for use by an advertiser. The analytics available through the reporting system 199 of the advertiser applications are different from the analytics capability available in the campaign optimizer 175. The campaign optimizer 175 permits tactical, action-oriented modifications. The reporting system 199 operates to drive more strategic analysis of performance and other factors. Reports are separated into several categories, as will be described in greater detail below.

The reporting system 199 interacts with other components of the pod 100 to interactively determine the requirements of a desired report, obtain the necessary data from the campaign data store or another source 105, and provide the report to an advertiser. As will be described in greater detail below, the advertiser interacts with a user interface to define the inputs to the report. These inputs define, for example, the time duration desired for the report, the advertisement component to be reported on, such as an ad group, a campaign, etc. The reporting system 199 obtains the necessary data and prepares the report in the specified format, such as graphical or tabular or otherwise. In response to further actuation by the advertiser or user, the reporting system 199 updates the report or changes the presentation of data. A large number of pre-defined reporting formats are available to address the needs of an advertiser to monitor his ads. This large number of ads may be further customized by the advertiser interacting with the user interface to specify particular reports or formats.

Figure 2:
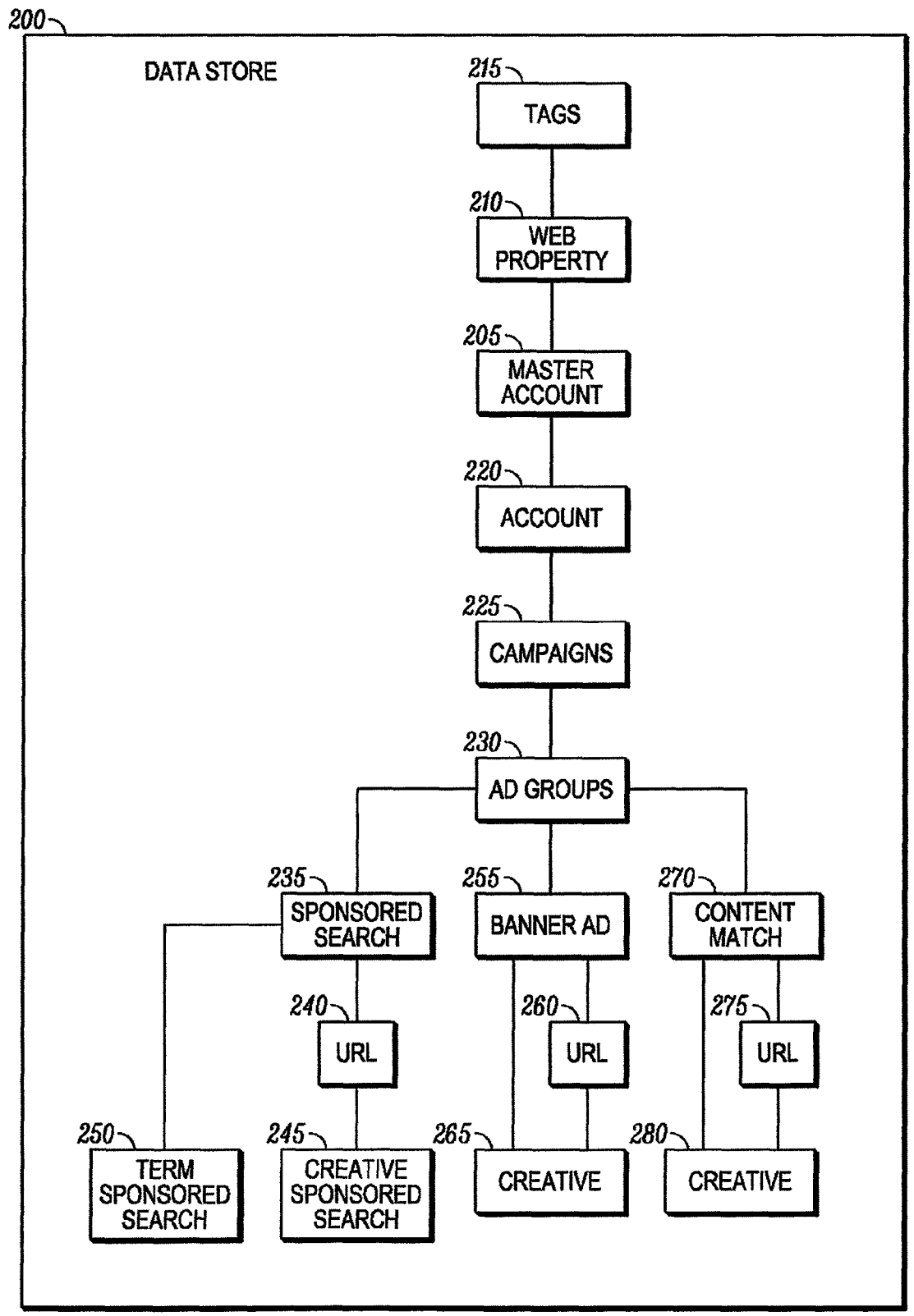
FIG. 2 is a block diagram of one embodiment of a model for the maintenance of advertisement campaign information according to the ad campaign management system of FIG. 1.

FIG. 2 is a diagram of one embodiment of a model for the maintenance of ads according to the ad campaign management system of FIG. 1. As depicted, an ad campaign management system comprises a data store 200 that facilitates hierarchical storage of ad campaign data, providing advertisers with multiple levels of structure for control of advertisement content. In particular, an advertiser utilizing services of the ad campaign management system may be provided with a master account 205 for receiving aggregated analytics relating to the master account 205 and managing or optimizing Web properties 210 and advertisements within the master account 205 based on the aggregated analytics. A Web property 210 may include a website, or a combination of related websites and pages for which the advertiser is advertising. Furthermore, within master account 205, an advertiser may create several accounts 220 to separately manage ad campaigns, as well as to collect ad performance information.

To facilitate tracking and collection of ad performance data from Web properties 210, data store 200 further maintains custom tags, program code, navigation code, etc. 215. According to one embodiment, a tag 215 may comprise a piece of code that is created by the system and placed on relevant Web pages of a given website to allow automatic tracking and collection of data indicative of customer session on the advertiser website. For example, a tag may be used to track user visits, interaction, or purchases from a website to which a user navigates as a result of clicking on an advertisement link associated with the website. Depending on specific needs and business objective of a given advertiser, tags may be coded to collect specific information about the customer session that is of interest to the advertiser. Thus, some tags may enable collection of data on numbers of raw clicks on the advertiser website, while others tags may track numbers of clicks that resulted in conversions, e.g., purchase of a product or service from the advertiser website. Those of skill in the art will recognize that data collection may be limited to other portions of the customer session.

Some embodiments utilize, or may be combined with, features or technologies, such as, for example, HTML tagging, data tracking, and related technologies, as described in U.S. patent application Ser. Nos. 09/832,434 and 09/587,236, the entirety of which are both hereby incorporated herein by reference.

In one embodiment, within a master account 205, an advertiser may maintain one or more accounts 220, which may be used to receive analytics related to a specific account 220 and manage ad campaign spending associated with individual Web properties 210. Thus, accounts 220 allow advertisers to distribute their advertising funding between different Web properties 210 and between separate ad campaigns 225. A given ad campaign 225 may include a set of one or more advertising activities or conduct directed to accomplishing a common advertising goal, such as the marketing or sales of a particular product, service, or content, or group of products, services or content. Two ad campaigns may be considered disparate when the ad campaigns are directed to different advertising goals. For example, an advertiser may wish to advertise a product for sale and a service associated with this product. Thus, the advertiser may store separate ad campaigns 225 for advertising the product and the service.

In one embodiment, storage of an ad campaign 225 may be further subdivided into several ad groups 230. An ad Group 230 may be thought of as a conceptual compartment or container that includes ads and ad parameters for ads that are going to be handled in a similar manner. An ad group 230 may allow for micro-targeting, e.g., grouping ads targeted to a given audience, a demographic group, or a family of products. For example, an ad group may be related to a given manufacturer's products, such as Sony, Microsoft, etc. or a family of high-end electronics, such as TVs, DVDs, etc. There is a number of ways in which a given group of ads may be managed in a similar manner. For example, an advertiser may specify that there be a certain markup (e.g., 50%) on items in a given ad group, may want to distribute all those ads in a certain way, or may want to spend a certain amount of its budget on those advertisements. Further, an ad group 230 provides a convenient tool for an advertiser to move a large group of ads and ad parameters from one ad campaign 225 to another ad campaign 225, or to clone a large group of ads and ad parameters from one ad campaign 225 to another ad campaign 225.

In one embodiment, changes made to the parameters of a given ad group 230 may apply to all ads within the given ad group. For example, one such parameter may be pricing. For a sponsored search, an advertiser may set the default price for the whole ad group but may override the price on each individual term. Similarly, an advertiser may further specify that certain terms are low value, but decide to increase the amount spent on another term uniformly across all ads in a given ad group. Thus, storage according to one or more ad groups 230 enables advertisers to bridge the gap between ad campaigns and the individual ads comprising a given ad campaign.

A given ad may contain one or more items of advertising content that are used to create ads/terms in an ad group, including, but not limited to, creatives (e.g., titles, descriptions) and destination URLs (plus associated URL tracking codes). Optionally, a given ad may contain a {KEYWORD} token for substitution of alternate text in the title, description, or other ad component. Furthermore, ads may exist as a template in an ad library (not pictured) that can be reused across ad groups or a local ad that is used and stored only within a specific ad group. The ad library, which may be provided by the ad campaign management system, allows advertisers to store ad templates, sharing and reusing them across campaigns and ad groups. Ads in the ad library may be shared within an account, e.g., each account has its own library.

An ad group 230 may utilize numerous tactics for achieving advertising goals. The term "tactic" includes a particular form or type of advertising. For example, in on-line advertising, tactics may include sponsored search result listings 235, banner advertisements 255, content match 270, etc. In off-line advertising, tactics may include television commercials, radio commercials, newspaper advertisements, etc. In different embodiments, tactics may include subsets or supersets of the listed examples or other examples. For instance, on-line advertising is an example of a broader tactic than the narrower tactic of sponsored search result listings. Furthermore, the advertiser may utilize multiple advertising channels for different tactics. For example, the advertiser may utilize sponsored search listings in several websites or portals, such as Yahoo!, Google.com, MSN.com, etc. In one embodiment, a user may set parameters within the ad group 230 to place a spend limit for each type of advertising tactic comprising the ad group 230.

One example of an advertising tactic is sponsored search 235. According to one embodiment, sponsored search 235 operates as follows: an auction-based system or marketplace is used by advertisers to bid for search terms or groups of terms, which, when used in a search, causes the display of a given advertiser's ad listings or links among the display results. Advertisers may further bid for position or prominence of their listings in the search results. With regard to auction-based sponsored search 235, a given advertiser may provide a uniform resource locator (URL) 240 to the webpage to which the ad should take the customer if clicked on, as well as the text of the advertisement 245 that should be displayed. Advertiser may further identify one or more terms 250 that should be associated with the advertisement 245.

Another example of advertising tactic is content match 270. Storage of content match advertisements 280 may be used by the advertiser to complement, or as alternative to, the sponsored search tactic 235. Ads stored according to the content match tactic 270 are displayed alongside relevant articles, product reviews, etc, presented to the customers. For the content match tactic 270, data store 200 stores one or more URLs 275 identifying the address of a webpage where given ad should take the customer if clicked on, as well as the text, image, video or other type of multimedia comprising the creative portion of the advertisement 280.

Yet another example of an advertising tactic is banner ad 255. Banner ad tactic 255 may be used by the advertiser to complement, or as alternative to, the sponsored search tactic 235 and content match tactic 270. In contrast to the sponsored search tactic and content match tactic, which are usually based on a pay-per-click payment scheme, an advertiser pays for every display of the banner ad 265, referred to as an impression. Alternatively, if the banner ad displays a phone number, advertiser may only be billed when a user calls the phone number associated with the advertisement. Thus, for the banner ad tactic, the data store 200 maintains a URL 260 to the webpage where the ad should take the customer if clicked on, as well as the creative that comprises the banner ad 265.

The data store 200 of the ad campaign management system may further store various parameters for each ad group. Such parameters may include, for example, maximum or minimum bids or bidding positions (rankings or prominence of listings) associated with a term or term cluster for the particular ad group or ads within a given ad group. As described above, in embodiments of an auction-based sponsored search result listings environment, prominence or rank of listings is closely related to ad performance, and therefore a useful parameter in ad campaign management. The rank of a given ad determines the quality of the placement of the ad on pages that are displayed to customers. Although details vary by advertising channel, top-ranked listings typically appear at the top of a page, the next listings appear in the right rail and additional listings appear at the bottom of the page. Listings ranked below the top five or so will appear on subsequent search results pages.

There is a correlation between rank and both number of impressions and click-through rate (clicks per impression), which provides an opportunity for advertisers to pay more per click (get a higher rank) in order to get more visitors to their web site. The result is that an advertiser may determine, how much the advertiser should be willing to bid for each listing based on the advertiser's business objectives and the quality of the traffic on their web site that is generated by the listing. This information may also be stored for a given ad group 230 in the data store 200 of the ad campaign management system of the present invention.

Figure 3:
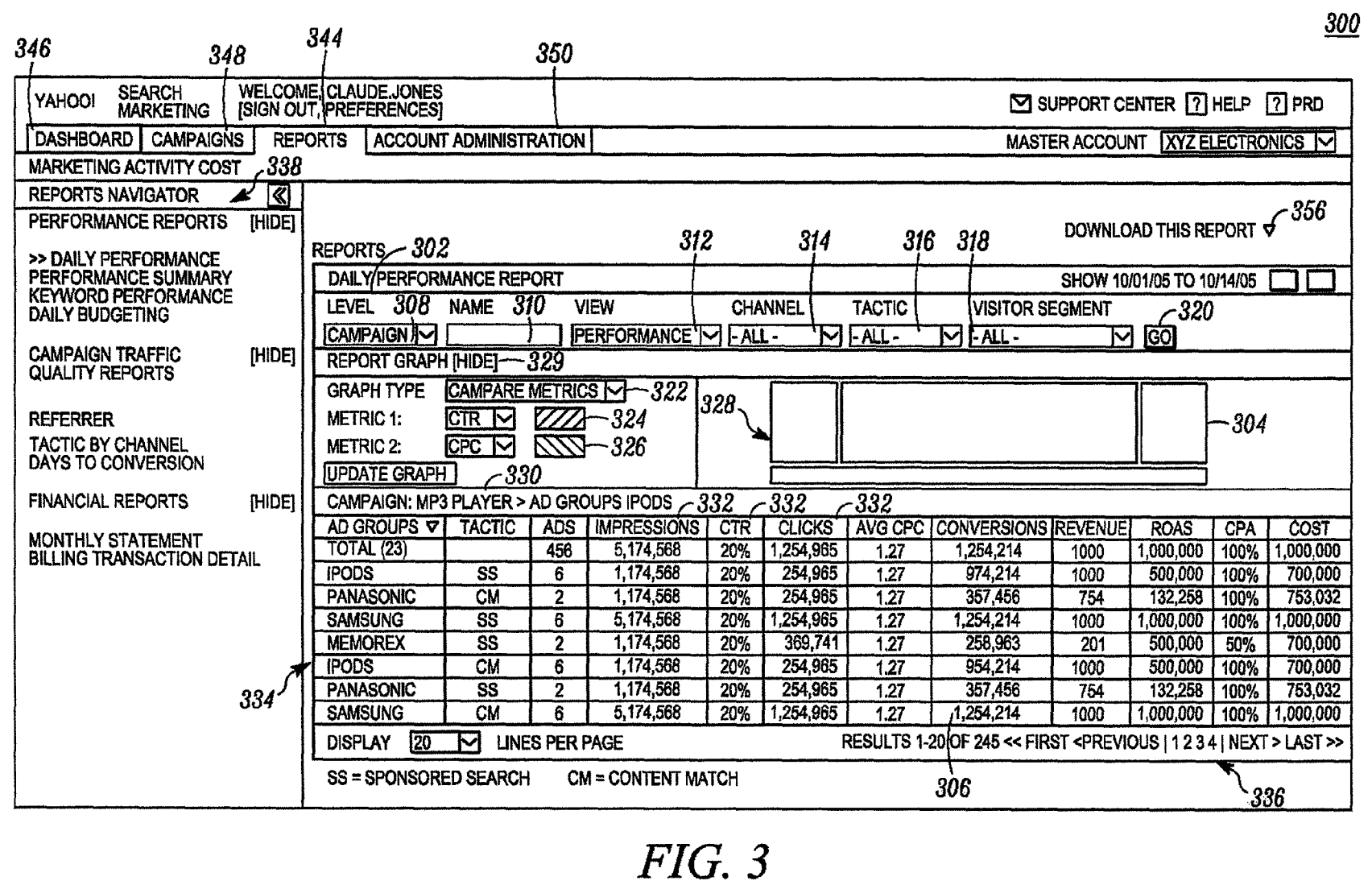

FIGS. 3-5 are examples of different embodiments of graphical user interfaces ("GUIs") 115 to the campaign management system of FIG. 1 that provide a user the ability to display, manage, optimize, or view and customize reports on, advertisement campaign information. FIG. 3 will first be described as being illustrative of available reports in general. Then, more detail about particular reports that are available will be provided.

FIG. 3 is an example of one embodiment of a GUI 300 displaying advertisement campaign information. Generally, the GUI 300 provides a high level summary of at least a portion of the ad campaigns and ad groups within a user account, a graphical illustration of performance parameters related to the user account.

In one embodiment, the GUI 300 comprises a filter section 302, a performance graph section 304, and an ad campaign/ad group summary section 306. In other embodiments, other features may be added or the presentation of these features may be modified to enhance ease of use, clarity or presentation or any other aspect.

The filter section 302 permits control of the presentation of a report to an advertiser. Filtering is preferably accessible and modifiable at all times while a report is being viewed. The filter section 302 includes controls for varying the reporting level in a level popup 308, specifying the name of the reporting level in a name window 310, specifying the reporting view in a view popup 312, specifying a channel in a channel popup 314, specifying a tactic in a tactic popup 316 and specifying a visitor segment in a segment popup 318. The filter section 302 further includes a go button 320. The popups 308, 312, 316 may be any suitable web interface element, such as a popup, a drop down, a text box or a series of hypertext links.

The level popup 308 specifies the level at which the report should be prepared. In accordance with the disclosed embodiment, possible levels which may be selected by the level popup 308 include the advertiser's account, a subaccount, a campaign or an ad group. Other levels may be specified. If a level does not yet exist, that level may not be displayed by the filter section 302. The name window 310 allows the advertiser to specify the name or other identification of the desired account, campaign or ad group. The view popup 312 allows the advertiser to specify a particular view to display. Examples include a performance view, a daily performance view, an ad performance view and a daily budgeting view. In the example view of FIG. 3, a version of the daily performance report is shown.

The channel popup 314 allows an advertiser to specify the advertising channel for which the report should be displayed. Examples of channels include channels such as Yahoo.com, Google.com and MSN.com in the online search tactic. The tactic popup 316 allows the advertiser to specify the advertising tactic for which the report should be displayed. A tactic includes a particular form or type of advertising. For example, in on-line advertising, tactics may include sponsored search result listings, banner advertisements, content match, etc. In off-line advertising, tactics may include television commercials, radio commercials, newspaper advertisements, etc. In different embodiments, tactics may include subsets or supersets of the listed examples or other examples. For instance, on-line advertising is an example of a broader tactic than the narrower tactic of sponsored search result listings. The possible selections set by the tactic popup 316 may depending on the account and other information and the tactics specified by the advertiser. The visitor segment popup 318 allows an advertiser to specify which portion of the visitor's population is viewed, based on collected visitor state data from the advertiser websites. Visitor state data is collected and stored in the campaign data store 105 (FIG. 1).

The filter section 302 forms an interface allowing a user to specify display inputs to the reporting system 199. The advertiser may use an internet browser to select entries on the popups and specify a name where appropriate. The advertiser then may activate the go button 320 to generate the report according to the inputs specified by the filter section 302.

Applying a change to filtering conditions requires an explicit action (e.g. a "Go" button, such as button 320). A date range is required as minimum input for any report to be executed. Additionally, where appropriate, a selection of hierarchy node should is also required. Preferably, the hierarchy defaults to "Account" level when not explicitly selected.

Filters common to all reports include:
Channel Selection
Tactic Selection
Date Range—default date range=last seven days for which there exist complete (i.e., books closed) data. Other common filter information may be required in other embodiments.

Additional filters available are specified on a per-report basis if available. These filters should are visible when a particular report is selected. Filtering preferably persists within the report pages for all reports during the user's session so that as the user views different reports, the filtering is retained. Session persistence should include the following filter settings:
Date range
"Hide/show graph" toggle
Pagination settings (rows per page)
Current filtering conditions applied are summarized with the report display at all times.

One particular filter offered in accordance with the present embodiments is a custom "shopper/conversion type" filter. The custom conversion type filter allows users to create named pairs of shopper and conversion tags to track different types of conversion activity on their websites. For example, a user could create a conversion type Transaction for purchases and another type Newsletter to track newsletter signups. Each of those custom types is assigned a specific shopper and conversion analytics tag to be deployed on the appropriate pages of their website.

When filtering on custom conversion types (in funnel views of analytics reports), the filter is applied by the conversion type identifier and filters shopper and conversion events only (as well as any revenue associated with the conversion). Lead and browser events in the report are NOT affected by the filter.

Example

Assume that for a specific day, the advertiser has 20 leads, 10 browsers, three conversions of type Newsletter (with zero revenue), and one conversion of type Transaction (with revenue $151). The filter such as click through rate ("CTR"), cost per click ("CPC") etc. Conversion and revenue metrics (e.g., CPA, Conversions, Revenue, return on ad spend or ROAS) are preferably only displayed if available (either via tagging or data feed). Finally, the performance graph section 304 includes a graph space 328 where the graph is drawn or presented. Display of the actual graph is controlled by a Hide/show graph toggle 329. The Hide/show graph toggle 329 may be clicked by a mouse or other user interface element to display the graph or remove it from display.

Graphing is based on the same data set and filters as the corresponding tabulated report, described below. Two types of graphing options are available. The first graphing option is a trend graph which shows a daily aggregation for the selected date range for the total of the selected (one or two) metrics. The date is shown on the x-axis. A user may select one or two of the other columns for the y-axis. The user can hover over data points on the graph to see the metric values in a tooltip. That is, by placing the mouse over the point on the graph, the metric value is displayed in a temporary popup display.

The second graphing option is a bar graph. A bar graph shows a summary aggregation for up to 25 top objects in the tabular report, based on current table sort order, for the selected metric. Clicking on a single bar navigates to the same report for the selected object's children for the selected date range.

Once rendered, a graph is updated only when the user takes explicit action on it (e.g., changes selected metric to be displayed and clicks the button labelled Update Graph) or something the graph depends on (e.g., selecting a different report, modifying the date range), as illustrated by the following user flow:

Tabular report lists ad groups+metrics, and is sorted on Revenue column
Bar graph shows top (e.g., 25) ad groups by revenue descending
User clicks "Cost" column heading in the table to change the sort (now by cost, descending)
Graph still shows top ad groups by revenue (descending)
User clicks the button labelled Update Graph
Graph is redrawn, still displaying revenue but sorted by cost

|  | Leads | Browsers | ... | Shoppers | Conversions | Revenue | ... |
|---|---|---|---|---|---|---|---|
| Filter applied: All Conversion Types | 20 | 10 |  | 4 | 4 | 151 |  |
| Filter applied: Newsletter Conversion Type | 20 | 10 |  | 3 | 3 | 0 |  |
| Filter applied: Transaction Conversion Type | 20 | 10 |  | 1 | 1 | 151 |  |

The performance graph section 304 includes controls for producing a graphical report of activity involving an advertiser's account or a portion of the account. The performance graph section 304 includes a graph type popup 322, a first metric specifier 324 and a second metric specifier 326. The graph type popup 322 allows the advertiser to specify what type of graph, such as a comparison of two specified metrics, should be produced. The metric specifiers 324, 326, allow the advertiser to specify what two metrics should be operated on, User selects "Cost" in the graph Metric dropdown and clicks the button labelled Update Graph
Graph is updated to show top ad groups by cost (descending)
When the user changes the view filter, the reporting system retains the graph metrics displayed and the summary table sort order. If the same metrics are not available, then the graph is reset to default.

The following table provides a summary of the graph types available by report:

| Report | Bar Graph | Trend Graph |
|---|---|---|
| Multi-Channel Performance Report - Campaign Performance | X | X |
| Multi-Channel Performance Report - {MARKETING_ACTIVITY} Performance | X | X |
| Multi-Channel Performance Report - Daily Performance | — | X |
| YSM Performance Report - Performance Summary | X | X |
| YSM Performance Report - Keyword Performance | X | X |
| YSM Performance Report - Daily Performance | — | X |
| YSM Performance Report - Performance by Geographic Location | X | X |
| YSM Performance Report - Daily Budgeting | — | X |
| Traffic Quality Report - Referrer | X | X |
| Traffic Quality Report - Tactic by Channel | X | X |
| Traffic Quality Report - Leads to Conversion | X | X |
| Traffic Quality Report - Days to Conversion | X | X |
| Financial Report - Monthly Statement | — | — |
| Financial Report - Billing Transaction Detail | — | — |

The ad campaign/ad group summary section 306 of the user interface 300 provides a tabular summary of data which form the report. In the illustrated embodiment, the summary section 306 includes a report identifier 330, table identifiers 332 and ad identifiers 334. The report identifier 330 clearly identifies the nature of the report, including the campaign and the ad group which are the subject of the report. The table identifiers 332 identify what data is presented in columns of the summary section 306, including raw data such as numbers of impressions or click throughs counted by the system for a specified ad group, and processed data such as click through rate ("CTR"). Preferably, the user may customize the report and hide any of the data columns in a predefined report. The "view" preferences should be persistent for each individual report type per user per account. Some columns are sortable, such as the column labeled "Ad Group" in FIG. 3. In this embodiment, a report can only be sorted on one column at a time. Sorting is reversible, allowing a switch between descending and ascending order.

The ad identifiers 334 identify on the rows of the summary section 306 the advertisement whose data is presented. The summary section 306 further includes navigation features 336 for allow navigation around the table.

The user interface 300 further includes a reports navigator section 338 which allows selection of different reports. In the illustrated embodiment, the reports are grouped according to type, such as performance reports, campaign traffic quality reports and financial reports. Within the performance reports, daily performance reports are available, including a performance summary report, a keyword performance and a daily budgeting report. Within the campaign traffic quality reports, available reports include reports by referrer, tactic/channel and days to conversion. Among the financial reports available are reports on monthly statements and billing transaction detail. Preferably, the listed reports are arranged as hyperlinks which can be clicked to reconfigure the user interface 300 into the selected type of report. By operating the filter section 302, the precise information displayed in the report can be controlled.

The user interface 300 is one page available to an advertiser or user and may be access by clicking a reports tab 344. Other pages are similarly accessible by clicking a dashboard tab 346, a campaigns tab 348 and an account administration tab 350.

The full list of reports is thus categorized and available at all times. The user is able to select a new report at any time, and this will cause the report to be executed, with no filtering, at the currently selected node of the hierarchy. In one embodiment, the illustrated report page serves as a default page. When a user clicks on the Reports tab, we should display the Performance Summary report for campaigns (i.e., Campaigns selected in the object hierarchy filter).

Report data may be downloaded. A download link 356 may be selected to initiate the download process. The user has the following options after clicking the download link 356: download tabular data; download graph data (for date-based and/or bar graph, as applicable); and download both tabular and graph data. In some embodiments, the graph image is not downloadable. However, the user can download the result set required to create the graph, if applicable for the report. The download file format includes the following for both the tabular and graph versions of reports: a header containing report name, sort column, filters, and an optional books closed method; a data table containing a header row with the column labels, a totals row, and then the detailed rows of data. All rows and all displayed columns in the result set are provided. There is no row limit. Download files are always compressed, for example, using the Winzip file compression utility. The download feature supports a variety of file formats such as comma separated values (CSV), tab separated values (TSV), extensible markup language (XML) and portable document format (PDF).

Below is a list of reports, metrics and filters that are available to an account based on its tagging configuration.

| Item | Type | No Tag | Conversion Counter | Advanced Tagging |
|---|---|---|---|---|
| Multi-Channel Performance Report - Campaign Performance | Report | — | — | X |
| Multi-Channel Performance Report - {MARKETING_ACTIVITY} Performance | Report | — | — | X |
| Multi-Channel Performance Report - Daily Performance | Report | — | — | X |
| YSM Performance Report - Performance Summary | Report | X | X | X |
| YSM Performance Report - Keyword Performance | Report | X | X | X |
| YSM Performance Report - Daily Performance | Report | X | X | X |
| YSM Performance Report - Performance by Geographic Location | Report | X | X | X |
| YSM Performance Report - Daily Budgeting | Report | X | X | X |
| Traffic Quality Report - Referrer | Report | — | — | X |
| Traffic Quality Report - Tactic by Channel | Report | — | — | X |
| Traffic Quality Report - Leads to Conversion | Report | — | — | X |
| Traffic Quality Report - Days to Conversion | Report | — | — | X |
| Financial Report - Monthly Statement | Report | X | X | X |
| Financial Report - Billing Transaction Detail | Report | X | X | X |
| Account Daily Spending Limit | Metric | X | X | X |
| Amount Attempted | Metric | X | X | X |

-continued

| Item | Type | No Tag | Conversion Counter | Advanced Tagging |
|---|---|---|---|---|
| Assists | Metric | — | — | X |
| Average Revenue per Conversion | Metric | — | X | X |
| AvgCPC | Metric | X | X | X |
| Browsers | Metric | — | — | X |
| Clicks | Metric | X | X | X |
| Conv. | Metric | — | X | X |
| Conv. Rate | Metric | — | X | X |
| Cost | Metric | X | X | X |
| Cost per Lead | Metric | — | — | X |
| CPA | Metric | — | X | X |
| CTR | Metric | X | X | X |
| Days Between Conversions | Metric | — | — | X |
| Days to First Conversion | Metric | — | — | X |
| First Conversions | Metric | — | — | X |
| Impr. | Metric | X | X | X |
| Leads | Metric | — | — | X |
| Revenue | Metric | — | X | X |
| ROAS | Metric | — | X | X |
| Shoppers | Metric | — | — | X |
| Transaction Type | Metric | X | X | X |
| Transaction Type NLS | Metric | X | X | X |
| VAT | Metric | X | X | X |
| Leads Between Conversions | Metric | — | — | X |
| Leads to First Conversion | Metric | — | — | X |
| Report View | Filter | — | — | X |
| Channel | Filter | — | — | X |
| Tactic | Filter | X | X | X |
| Conversion Type | Filter | — | — | X |
| Visitor Segment | Filter | — | — | X |

Legend
X = available to the account
— = not available to the account

Reports that provide data aggregated for objects (campaigns, ad groups, etc.) aggregate that data by object name, not object identifier. This means that a row of data in the tabular report—e.g., a row in which the campaign name is "Winter Clearance"—will show aggregated data for all campaigns of that name across the entire Account. Aggregation by name rather than identifier applies to both multi-channel and search marketing specific reports. Preferably, multi-channel reports are available only to certain accounts.

In a Campaign Performance report, a summary of performance is presented for objects at a selected hierarchy level; data can span (or be restricted to) campaigns, ad groups, or keywords. This is illustrated in the following table:

| Level | Name | Report View | Channel | Tactic | Conversion Type | Visitor Segment | Date |
|---|---|---|---|---|---|---|---|
| Campaign | Contains | Performance | All | All | All | New | From: |
| Ad Group | Begins with | Sales Funnel | Channel1 | Tactic1 | ConvType1 | Returning | To: |
| Keyword | Is Exactly | Cost Funnel | Channel2 | Tactic2 | ConvType2 | Customer | |
| | [____] | Revenue Funnel | Etc. | Etc. | Etc. | Repeat Customer | |
| | | | | | | Cookies Off | |

Available filters are shown across the top of the table. When "Customer" or "Repeat Customer" is selected in the Visitor Segment filter, the Conversion Type filter is disabled. Since there is no attempt to distinguish among custom conversion types by visitor segment, the analytics would not be consistent across the different filtered views.

In one embodiment, the Performance view includes the columns in the table below:

| Name | Leads | Assists | Conv. | Conv. Rate | CPA | Cost | Rev. | Avg. Rev. Per Conv.($) | ROAS | Cost per Lead |
|---|---|---|---|---|---|---|---|---|---|---|
| Totals | | | | | | | | | | |
| Object 1 | | | | | | | | | | |
| Object 2 | | | | | | | | | | |
| Etc. | | | | | | | | | | |

The Funnel views include different variants of funnel metrics. These are shown in the table below:

| Funnel View: Sales Cost Revenue Name | Total # of Cost per Revenue per Leads | Total # of Cost per Revenue per Browsers | Total # of Cost per Revenue per Shoppers | Total # of Cost per Revenue per Assists | Total # of Cost per Revenue per Conversions | Revenue | Cost | ROAS |
|---|---|---|---|---|---|---|---|---|
| Totals | | | | | | | | |
| Object 1 | | | | | | | | |
| Object 2 | | | | | | | | |
| Etc. | | | | | | | | |

One row is provided for each object in the selected hierarchy level, showing its aggregated data for the specified date range. Drilling down displays the report for the children of the selected object. No drilldown is provided for keywords. The Conversion Type dropdown is only available if more than one exists for the advertiser's account.

The {MARKETING ACTIVITY} Performance view provides a summary of performance for a filtered set of {MARKETING_ACTIVITIES} within a selected hierarchy level. Data can span (or be restricted to) campaigns and/or ad groups matching the respective name filters. Organization is shown in the table below:

| {(MARKETING_ACTIVITY}Name | Report View | Channel | Tactic | Conversion Type | Visitor Segment | Date |
|---|---|---|---|---|---|---|
| Contains Begins with Is Exactly | Performance Sales Funnel Cost Funnel Revenue Funnel | All Channel1 Channel2 Etc. | All Sponsored Search Content Match | All ConvType1 ConvType2 Etc. | New Returning Customer Repeat Customer Cookies Off | From: To: |

The Performance view for a Marketing Activity report includes these columns:

| Name | Ad Group | Campaign | Leads | Assists | Conv. | Conv. Rate | CPA | Cost | Rev. | Avg. Rev. Per Conv.($) | ROAS | Cost per Lead |
|---|---|---|---|---|---|---|---|---|---|---|---|---|
| Totals | | | | | | | | | | | | |
| {ACTIVITY} 1 | | | | | | | | | | | | |
| {ACTIVITY} 2 | | | | | | | | | | | | |
| Etc. | | | | | | | | | | | | |

The Funnel views for a Marketing Activity report include different variants of the funnel metrics, as shown below:

| Funnel View: Sales Cost Revenue Activity | Ad Group | Campaign | Total # of Cost per Revenue per Leads | Total # of Cost per Revenue per Browsers | Total # of Cost per Revenue per Shoppers | Total # of Cost per Revenue per Assists | Total # of Cost per Revenue per Conversions | Revenue | Cost | ROAS |
|---|---|---|---|---|---|---|---|---|---|---|
| Totals | | | | | | | | | | |
| {ACTIVITY} 1 | | | | | | | | | | |
| {ACTIVITY} 2 | | | | | | | | | | |
| Etc. | | | | | | | | | | |

This report differs from the other performance reports in that it is aggregated by object identifier rather than name, which allows the display of the parent Campaign and Ad Group name columns. The bar graph for this report shows the campaign, ad group, and activity names for the graphed objects. The table portion of the report is organized with one row per {MARKETING_ACTIVITY} in the search results, showing data aggregated to the {MARKETING_ACTIVITY} level for the report date range. A Conversion Type dropdown is only available if more than one exists for the advertiser's account.

The Daily Performance report provides daily breakdown of performance for the selected hierarchy level/objects. The report in FIG. 3 is an example of a Daily Performance report. Generally, in one embodiment, the following organization is used:

| Level | Name | Report View | Channel | Tactic | Conversion Type | Visitor Segment | Date |
|---|---|---|---|---|---|---|---|
| Campaign Ad Group | Contains Begins with Is Exactly [____] | Performance Sales Funnel Cost Funnel Revenue Funnel | All Channel1 Channel2 Etc. | All Sponsored Search Content Match | All ConvType1 ConvType2 Etc. | New Returning Customer Repeat Customer Cookies Off | From:[__] To:[__] |

The Performance view for a Daily Performance report may include the columns shown in the following table:

| Name | Leads | Assists | Conv.↓ | Conv. Rate | CPA | Cost | Rev. | Avg. Rev. Per Conv.($) | ROAS | Cost per Lead |
|---|---|---|---|---|---|---|---|---|---|---|
| Totals mm/dd/yyyy mm/dd/yyyy Etc. | | | | | | | | | | |

The Funnel views for a Daily Performance report may include different variants of the funnel metrics:

| Funnel View: Sales Cost Revenue Name | Total # of Cost per Revenue per Leads | Total # of Cost per Revenue per Browsers | Total # of Cost per Revenue per Shoppers | Total # of Cost per Revenue per Assists | Total # of Cost per Revenue per Conversions | Revenue | Cost | ROAS |
|---|---|---|---|---|---|---|---|---|
| Totals mm/dd/yyyy mm/dd/yyyy Etc. | | | | | | | | |

Generally, the report displays one row per day in the date range, showing data aggregated to the account level for that date. The "Name" column—mm/dd/yyyy (date)—is not hyperlinked.

Along with multi-channel reports, another type of report available is search marketing Performance Reports. In accordance with the present embodiment, these reports are for Sponsored Search and Content Match tactics only. Some filters and columns require advanced tagging for the advertiser's search marketing account.

A Performance Summary report provides a summary of performance across a date range, down to single day granularity, at the selected hierarchy level/objects. Organization is shown in the table below:

| Account | Object Level | Object Name | Tactic | Conversion Type | Date |
|---|---|---|---|---|---|
| All Accounts Account 1 Account 2 Account Etc. | Campaign Ad Group Keyword | Contains Begins with Is Exactly [____] | All Sponsored Search Content Match | All ConvType1 ConvType2 Etc. | From:[__] To:[__] |

The Performance view for a Search Marketing Performance report includes the following columns:

| Name | Impr | CTR | Clicks | AvgCPC | Assists | ConvRate | Conv. | CPA | Rev. | ROAS | Cost |
|---|---|---|---|---|---|---|---|---|---|---|---|
| Totals | | | | | | | | | | | |
| Object 1 | | | | | | | | | | | |
| Object 2 | | | | | | | | | | | |
| Etc. | | | | | | | | | | | |

In the report, there is one row for each object in the selected hierarchy level, showing its aggregated data for that date range. An object is hyperlinked to the Performance Summary Report (i.e., this report) for all its child objects.

A Keyword Performance report provides a summary of performance for a keyword or set of keywords for a Sponsored Search account (not Content Match). Data can potentially span multiple ad groups, campaigns, etc. The following organization may be used:

| Account | Level | Keyword Name | Conversion Type | Date |
|---|---|---|---|---|
| All Accounts Account 1 Account 2 Account Etc. | Campaign Ad Group | Contains Begins with Is Exactly [____] | All ConvType1 ConvType2 Etc. | From: [__] To: [__] |

The Performance view for a Keyword Performance report includes the following columns:

| Keyword | Ad Group | Campaign | Impr | CTR | Clicks | AvgCPC | Assists | ConvRate | Conv. | CPA | Rev. | ROAS | Cost |
|---|---|---|---|---|---|---|---|---|---|---|---|---|---|
| Totals | | | | | | | | | | | | | |
| Keyword 1 | | | | | | | | | | | | | |
| Keyword 2 | | | | | | | | | | | | | |
| Etc. | | | | | | | | | | | | | |

This report differs from the other performance reports in that it is aggregated by object identifier rather than name, which allows display of the parent Campaign and Ad Group name columns. The bar graph produced with the report shows the campaign, ad group, and activity names for the graphed objects. In the table of the report, one row is assigned per keyword in the search results, showing data aggregated to the keyword level for the report date range A Daily Performance provides a daily breakdown of performance for the selected hierarchy level/objects. Organization is as follows:

| Account | Object Level | Object Name | Tactic | Conversion Type | Date |
|---|---|---|---|---|---|
| Account 1 Account 2 Account Etc. | Campaign Ad Group Keyword | Contains Begins with Is Exactly [____] | All Sponsored Search Content Match | All ConvType1 ConvType2 Etc. | From: [__] To: [__] |

The Performance view for a Daily Performance report includes the following columns:

| Date | Impr | CTR | Clicks | AvgCPC | Assists | ConvRate | Conv. | CPA | Rev. | ROAS | Cost |
|---|---|---|---|---|---|---|---|---|---|---|---|
| Totals | | | | | | | | | | | |
| mm/dd/yyyy | | | | | | | | | | | |
| mm/dd/yyyy | | | | | | | | | | | |
| Etc. | | | | | | | | | | | |

In the preferred embodiment, this report displays one row per day in the date range, showing data aggregated to the account level for that date. The "Name" column—mm/dd/yyyy (date)—is not hyperlinked.

A Performance by Geographic Location report provides analytics about geo-targeting results for managed tactics (i.e., Sponsored Search and/or Content Match) acquired from serving-based data. Serving will accredit each event to the appropriate geo-targeted entity (i.e., DMA or State/Province, by WoE ID) and this data will be included in the feed sent to the advertiser application. The analytics always encompass both the consumer's geographic location (i.e., where the consumer is located) and geographic intent (i.e., when search terms or webpage content imply geo-specific interest, such as a search for "Disneyland vacation"). This report shows performance by geo-targeted area (DMA or State/Province)—as accredited by serving for each serving event—attributed to campaigns in the advertiser's account for the specified date range. This information is organized as follows:

| Geo-level | Tactic | Date |
|---|---|---|
| State/Province | All | From: |
| DMA | Sponsored Search | To: |
| | Content Match | |

The Performance by Geographic Location report in one embodiment includes the following columns:

| Geo-location Name | Impr | CTR | Clicks | AvgCPC | Cost |
|---|---|---|---|---|---|
| Totals | | | | | |
| Geolocation 1 | | | | | |
| Geolocation 2 | | | | | |
| Etc. | | | | | |

A Daily Budgeting report shows daily spend allocation and distribution at the account level. This is organized as follows:

| Account | Data |
|---|---|
| Account 1 | From: |
| Account 2 | To: |
| Account Etc. | |

In one embodiment, the Daily Budgeting report includes the following columns:

| Date | Impr | Clicks | Account Daily Spending Limit | Actual Spend | Avg.CPC |
|---|---|---|---|---|---|
| Totals | | | | | |
| mm/dd/yyyy* | | | | | |
| mm/dd/yyyy | | | | | |
| Etc. | | | | | |

One row is assigned for each date in the date range. The totals row shows aggregated data for the selected account for the entire date range. Preferably the report indicates (e.g., with an asterisk) when the account daily spending limit changed for the day.

Along with multi-channel reports and search marketing Performance Reports, another type of report available is Traffic Quality Reports. A first Traffic Quality Report is a Referrer report. This report provides a summary of performance by referring website for the YSM Account. This information is organized as follows:

| Conversion Type | Date |
|---|---|
| All | From: |
| ConversionType1 | To: |
| ConversionType2 | |
| Etc. | |

In one embodiment, the Referrer report includes the following columns:

| Referrer | Leads | Browsers | Shoppers | Assists | Conv. | Conv. Rate | Revenue | Avg. Rev. per Conv. | Cost |
|---|---|---|---|---|---|---|---|---|---|
| Totals | | | | | | | | | |
| Ref. Domain 1 | | | | | | | | | |
| Ref. Domain 2 | | | | | | | | | |
| Etc. | | | | | | | | | |

Preferably, one row is provided for each referring domain, showing its aggregated data for that date range. No drilldown is available with this report. A Conversion Type filter should only be displayed if more than one type exists for the search marketing account.

A second Traffic Quality Report is a Tactic by Channel report. This report provides a summary of performance for each tactic segmented by channel for the YSM Account. This information is organized as follows.

| Channel | Tactic | Conversion Type | Visitor Segment | Date |
|---|---|---|---|---|
| All | All | All | New | From: |
| Channel1 | Tactic1 | ConversionType1 | Returning | To: |
| Channel2 | Tactic2 | ConversionType2 | Customer | |
| Etc. | Etc. | Etc. | Repeat Customer | |
| | | | Cookies Off | |

When "Customer" or "Repeat Customer" is selected in the Visitor Segment filter, the Conversion Type filter is disabled. Since no attempt is made to distinguish among custom conversion types by visitor segment, the analytics are not consistent across the different filtered views).

In one embodiment, the Tactic by Channel report includes the following columns:

| Tactic | Channel | Leads | Browsers | Shoppers | Assists | Conv | Conv. Rate | Revenue | Avg. Rev. per Conv | Cost |
|---|---|---|---|---|---|---|---|---|---|---|
| Totals | | | | | | | | | | |
| Tactic 1 | | | | | | | | | | |
| Tactic 2 | | | | | | | | | | |
| Etc. | | | | | | | | | | |

Preferably, one row is provided for each tactic showing aggregated data for the selected date range showing channels that contributed traffic for that tactic during that period. No drilldown is available with this report. A Conversion Type filter should only be displayed if more than one type exists for the advertiser's account. In the Graph portion of the report, the bar chart should include channel/tactic combinations (up to a maximum of 25) displayed in the tabular report data graphed for the selected metric. No drilldown supported on the graph bars.

A third Traffic Quality Report is a Leads to Conversion report. This report provides a summary of conversion and revenue performance for the tagged web property by leads-to-first-conversion and leads-between-conversions for the search marketing account. This information has the following format:

| View | Tactic | Conversion Type | Date |
|---|---|---|---|
| First Conversion | All | All | From: ☐ |
| Between Conversions | Tactic1 | ConversionType1 | To: ☐ |
| | Tactic2 | ConversionType2 | |
| | Etc. | Etc. | |

In one embodiment, the Leads to Conversion report includes the following columns:

| Leads [Between Conversions] to First Conversion] Totals | [Conversions] First Conversions] | Revenue | Average Revenue per Conversion |
|---|---|---|---|
| 1 | | | |
| 2 | | | |
| Etc. | | | |
| 19 | | | |
| 20 or more | | | |

The View filter changes the first and second column headings between the following:

> When View filter = "First Conversion"
> Column 1 = "Leads to First Conversion"
> Column 2 = "First Conversions"
> When View filter = "Between Conversions"
> Column 1 = "Leads between Conversions"
> Column 2 = "Conversions"

One row is provided in the report for each number of leads as listed above, showing aggregated data for the selected date range. No drilldown is available with this report.

A fourth Traffic Quality Report is a Days to Conversion report. This report provides a summary of conversion and revenue performance for the tagged web property by days-to-first-conversion and days-between-conversions for the search marketing account. This information is organized as follows:

| View | Tactic | Conversion Type | Date |
|---|---|---|---|
| First Conversion | All | All | From: ☐ |
| Between Conversions | Tactic1 | ConversionType1 | To: ☐ |
| | Tactic2 | ConversionType2 | |
| | Etc. | Etc. | |

The View filter may take two different values. When the View filter selection is set to "First Conversion," the following columns are presented:

| Days to First Conversion Totals | First Conversions | Revenue | Average Revenue per Conversion |
|---|---|---|---|
| 0 to 1 | | | |
| 1 to 3 | | | |
| 3 to 7 | | | |
| 7 to 15 | | | |
| 15 to 30 | | | |
| 30 or more | | | |
| Etc. | | | |

When the View filter selection is set to "Between Conversions" the following columns are presented:

| Days Between Conversions Totals | Conversions | Revenue | Average Revenue per Conversion |
|---|---|---|---|
| 0 to 7 | | | |
| 7 to 30 | | | |
| 30 to 90 | | | |
| 90 to 180 | | | |
| 180 or more | | | |
| Etc. | | | |

Preferably, one row is provided in the report for each number of days period as listed above, showing aggregated data for the selected date range. Also, no drilldown is available with this report.

Along with multi-channel reports, search marketing Performance Reports, and Traffic Quality Reports, another type of report available is Financial Reports. A first Financial Report is a Monthly Statement report. This report provides a downloadable file (in PDF and text format) containing statements of account activity for prior calendar months. This report information is organized as follows:

| Item | Requirement |
|---|---|
| Inputs | Month selection from the last six (6) calendar months |
| Report Data | One row per downloadable report<br>Monthly Summary<br>Monthly Activity<br>Monthly Financial |
| Download | For each report, there will be a download option in TXT and PDF formats. |
| Filters | This report will have no filters available, including the default filters, apart from the date range. |

A second Financial Report is a Billing Transaction Detail report. This report provides a list of all invoice/billing transactions for the specified date range. The following filter is provided:

| Date |
|---|
| From: ☐ ▢ |
| To: ☐ ▢ |

In one embodiment, the Billing Transaction Detail report includes the following columns:

| Date | Transaction Type | Transaction Type NLS | Credit Card # | Amount Attempted | Net Charge | VAT | Total |
|---|---|---|---|---|---|---|---|
| Totals | | | | | | | |
| mm/dd/yyyy | | | | | | | |
| mm/dd/yyyy | | | | | | | |
| Etc. | | | | | | | |

Preferably, the date range is restricted to the previous six calendar months. The report displays one row per billing charge entry.

FIG. 4 is an example of a marketing activity cost report 400. FIG. 5 is an example of a Marketing Activity Cost entry page 500. The Marketing Activity Cost feature is a way for users to apply variable and fixed cost to marketing activities in non-managed channels and tactics, such as shopping, banner ads, e-mail campaigns, advertising on other paid search networks, etc. The costs for sponsored search or content match activities come directly from a data source such as the business information group ("BIG") 155 (FIG. 1), via a feed, and cannot be added/edited. In the illustrated embodiment, Marketing Activity Cost is available as a secondary navigation item in the Reports area of the application (FIG. 3).

Marketing Cost can be entered at various levels in the account hierarchy. The entered Marketing Cost can be made to apply to activities for a channel/tactic either across the entire search marketing account, or for a specific campaign, ad group or individual activity. Marketing Cost is applied to all marketing activities below the level at which the cost is set.

The variable cost for a marketing activity is captured when the collection event occurs. The user cannot retroactively apply or modify cost.

Data shown on the 'Marketing Activity Cost' list page, FIG. 4, is common to all users of the advertiser's account. Since these items are not associated with a specific spend account in the advertiser's account, this data is common and will be displayed for anyone who has access to the page. Campaign management screens, as well as the search marketing Performance reports, will not show any of the marketing activity cost data.

Any reports that are aggregated by name and are supposed to show marketing activity cost data (e.g., Multi-Channel Performance reports) include these analytics along with the data for managed entities as long as the entity names match.

In the Marketing Activity Cost List page 400 of FIG. 4, existing activity cost entries are displayed in a table 402 with filters 404. Each entry includes table entries for the entry's campaign, ad group, activity, channel and tactic. The user can add manual cost entries via a user interface that navigates to a Marketing Activity Cost entry page (FIG. 5) with standard interaction for tactic, channel, cost, etc., that adds to a list. Thus, the Marketing Activity Cost List page 400 of FIG. 4 includes a button labeled "Add a Cost Entry" which, when actuated, directs the user's browser to the Marketing Activity Cost entry page 500 of FIG. 5.

Any suitable filtering operation may be provided in the Marketing Activity Cost List page 400 of FIG. 4. In one embodiment, filtering using the filters 400 of FIG. 4 works as follows. If a channel/tactic IS NOT specified, then the Marketing Activity Cost List page 400 shows entries for the selected account hierarchy object for all channel/tactics, along with a reference to its parent objects. If a channel/tactic IS specified, then the Marketing Activity Cost List page 400 only shows entries for the entity for the selected channel/tactic.

In the Marketing Activity Cost entry page 500 of FIG. 5, the page 500 includes an Add Entry button 502 to permit adding a marketing activity cost entry. The page 500 further includes an area 504 for specifying cost configurations. Information entered in this area 504 includes starting and ending dates for tracking marketing activity costs, an assigned variable cost, an allocation period and a fixed allocation. A further area 506 is provided for the user to specify marketing activity detail. This information includes a campaign identifier, an ad group identifier, an activity identifier, a tactic and a channel.

FIG. 6 is a block diagram of one embodiment of a system 600 for providing advertisement campaign information about an advertisement campaign to an advertiser. The system 600 typically comprises an advertisement service provider 602 (advertisement campaign management system) comprising one or more servers in communications with a user device 604 over a network 606. Generally, an advertisement service provider 602 organizes advertisement campaign information into an account hierarchy, as described above, according to a user account, one or more ad campaigns associated with the user account, one or more ad groups associated with the ad campaigns, and keyword and advertisement information associated with the ad groups. After organizing the advertisement campaign information, the advertisement service provider 602 sends at least a portion of the advertisement campaign information to the user 604 for display based at least in part on the one or more ad groups.

Each server of the advertisement service provider 602 may comprise a processor 608, a network interface 610 in communication with the processor 608, and a memory unit 612 in communication with the processor 608. Typically, the memory unit 612 stores at least advertisement campaign information. Advertisement campaign information may comprise information relating to relationships between a user account, ad campaigns, and ad groups; performance parameters associated with a user account, ad campaigns, and ad groups; or advertisements and keywords associated with a user account, ad campaigns, and ad groups.

The processor 608 is typically operative to perform one or more operations to organize the advertisement campaign information stored in the memory unit 612 into one or more ad groups as defined by an advertiser. As described above, an ad group may be thought of as a conceptual compartment or container that includes advertisements and parameters for advertisements that are handled in a similar manner.

After organizing the advertisement campaign information into one or more ad groups, the advertisement service provider 602 may send at least a portion of the advertisement campaign information to the user device 604 via the network interface 3210 for display based at least in part on the one or more ad groups. In one embodiment, the advertisement service provider 602 sends one or more hypertext pages that comprise a graphical user interface such as those in FIGS. 3-5 when the one or more hypertext pages are executed in an internet-browser, stand-alone application, or any other device known in the art.

FIG. 7 is a flow diagram of one embodiment of a method for providing advertisement campaign information about an advertisement campaign to an advertiser. The method begins at block 700.

From the foregoing, it can be seen that the present embodiments provide a method and system for reporting on advertisements and the advertiser's accounts. A system for managing advertisements includes a reporting system which receives advertiser inputs and data defining interactions with advertisements organized in accounts, campaigns and ad groups. The reporting system uses these input sources and produces computer-based reports illustrating the status and historical success of the advertiser's advertisements. The reports are readily varied and updated to show a variety of aspects of the success of the advertisements.

It is therefore intended that the foregoing detailed description be regarded as illustrative rather than limiting, and that it be understood that it is the following claims, including all equivalents, that are intended to define the spirit and scope of this invention.

The invention claimed is:

1. An online advertisement system, the system comprising:
   an advertisement campaign management system configured to store advertisement campaign information for a plurality of advertisers, respective advertisement campaign information being organized by a respective advertiser into at least one advertising campaign, the at least one advertising campaign being organized into at least two ad groups, at least one of the ad groups being organized into a plurality of advertising tactics including search result listings, banner advertisements and content match, the at least one of the ad groups including at least two advertisements, each of the at least two advertisements being a part of a respective advertising tactic, wherein each ad group includes respective ad group parameters and each of the at least two advertisements includes respective ad parameters, each ad group organized so that changes made to the respective ad group parameters of a selected ad group will apply to the respective ad parameters of all advertisements in the selected ad group;

a web interface in data communication with the advertisement campaign management system and configured to receive advertiser inputs from the respective advertiser, the advertiser inputs including display-defining inputs specifying filters to be applied to the advertisement campaign information for presentation to the advertiser of a visual report on the advertisement campaign, the display-defining inputs specifying filters that control display of information based on advertiser selections of advertising campaign, ad group and advertising tactic to produce filtered advertisement campaign information, and the web interface further being configured to provide the visual report including the filtered advertisement campaign information to the advertiser based on the received display-defining inputs;

a campaign data store configured to store advertisement campaign account data; and a reporting system in data communication with the campaign data store and the web interface to produce the visual report about performance of the advertisement campaign and provide the visual report to the web interface, the visual report being based on the organization of the advertisement campaign information into the at least one advertising campaign, the at least two ad groups and the plurality of advertising tactics.

2. The system of claim 1 wherein the plurality of advertising tactics comprises a sponsored search tactic, a banner ad tactic and a content match tactic.

3. The system of claim 1 wherein the at least two ad groups comprises advertisements and ad parameters for advertisements that are defined by the advertiser, the ad parameters including an advertising tactic parameter, a performance parameter and a user demographic or product family parameter.

4. The system of claim 1 wherein the reporting system comprises a plurality of filters responsive to the display-defining inputs, the plurality of filters comprise at least one of:
   a level filter to select a particular advertising campaign or an ad group,
   a view filter to select a particular report format;
   a channel filter to select advertisement campaign account data from the campaign data store for a particular advertising channel; and
   a tactic filter to select advertisement campaign account data from the campaign data store for a particular advertising tactic.

5. The system of claim 1 wherein the web interface comprises a plurality of popups or drop downs for specifying the plurality of filters.

6. The system of claim 1 wherein the reporting system is configured to produce a graphical display about performance of a specified advertising campaign based on limits set by the plurality of filters.

7. A method for providing to an advertiser advertisement information about an advertisement campaign in an online information system including one or more servers, the method comprising:
   using a server of the advertisement management system, collecting advertisement information from an advertisement campaign service provider;
   in response to input information received at the server from an advertiser, organizing the collected advertisement information into at least one advertising campaign, organizing the at least one advertising campaign into at least two ad groups, and organizing at least one of the ad groups into a plurality of advertising tactics including search result listings, banner advertisements and content match, the at least one of the ad groups including at least two advertisements, each of the at least two advertisements being a part of a respective specified advertising tactic, wherein each ad group includes respective advertiser-specified ad group parameters and each of the at least two advertisements includes respective advertiser-specified ad parameters, each ad group organized so that changes made to the respective ad group parameters of a selected ad group will apply to the respective ad parameters of all advertisements in the selected ad group using the server, sending a portion of the collected advertisement information to a graphical user interface operated in conjunction with a user device for display to a user;

using the server, receiving user commands entered via the graphical user interface at the user device to organize the displayed advertisement information according to the respective ad group parameters and the respective ad parameters;

using the server of the advertisement management system, receiving advertiser display inputs entered via the graphical user interface at the user device, the display inputs defining a visual report including user report graphical displays and user report tabular displays which illustrate advertisement information of interest to the advertiser in a format specified by the advertiser at the user device, the format based on organization of the advertisement information into at least one advertising campaign, at least two ad groups and a plurality of advertising tactics; and in response to the received advertiser display inputs, at the server, providing data to produce a visual report on a data display device which includes a processor for processing data, the visual report about performance of the advertisement campaign, the visual report being based on the organization of the advertisement information into at least one advertising campaign, at least two ad groups and a plurality of advertising tactics, including arranging the portion of the collected advertisement information into a user interface arrangement defined according to the received display inputs to provide the advertisement information of interest to the user in the format specified by the user.

8. The method of claim 7 wherein receiving advertiser display inputs comprises:

receiving filter inputs entered via the graphical user interface at the user device to select a particular advertising campaign, a particular ad group or a particular advertising tactic;

and wherein providing data to produce the visual report comprises providing data to produce the visual report for only the selected campaign or ad group.

* * * * *